: 2,859,148

METHOD OF PRODUCING A BOEHMITE LAYER ON ETCHED ALUMINUM FOILS

Dietrich Altenpohl, Singen, Hohentwiel, Germany, assignor to Aluminium-Walzwerke Singen G. m. b. H., Singen, Hohentwiel, Germany, a company limited of Germany No Drawing. Application December 15, 1955
Serial No. 553,205

Claims priority, application Germany December 16, 1954

2 Claims. (Cl. 148—6.27)

The electrodes of electrolytic capacitors are made of aluminum foil of from 99.8% to 99.99% purity. In the treatment of the aluminum foil, the surface thereof is first etched or roughened by chemical or electrolytic methods in order to increase the effective surface area of the foil; then a dielectric film is formed on the surface by well known electrolytic methods. After etching it is important that the surface be cleaned to remove the acid and salt residues adhering thereto. During the cleaning, however, a hydrated oxide-layer is formed on the aluminum surface, which layer, according to the cleaning and drying conditions, shows differences in thickness, structure, water content and (as the etching process is usually performed in electrolytes containing chloride ions) also in the chloride content. Heretofore, in cleaning the etched aluminum foil, the only concern has been to obtain the highest possible decrease in the chloride content, and due concern has not been given to the oxide layer which is produced in the process. I have found, however, that this oxide-layer can be used beneficially, provided due care is taken to form it uniformly thereon without fissures and within a certain range of thickness, and provided, further, that the surface on which the oxide-layer is formed is relatively chloride free.

The present invention relates to a method of producing an oxide-layer which imparts to the etched aluminum surface a high protection against corrosion and optimal electric qualities which make the foil suited for use in electrolytic capacitors. More specifically, the object of the present invention is to form a non-fissured layer of $\alpha$-alumina monohydrate (written as $Al_2O_3,H_2O$ according to the Encyclopedia of Chemical Technology by Kirk-Othmor, vol. I, page 641, and in Hackh's Chemical Dictionary, 3rd ed.), known generally as boehmite, of proper thickness on the etched surface of the aluminum foil. If properly formed, this layer effectively protects the surface against corrosion before the formation of the dielectric film and substantially facilitates the formation of the dielectric film by reducing the consumption of electrical power necessary in forming the dielectric film by electrolysis.

In the making of electrolytic capacitors troubles may arise because of a non-uniform growth of the dielectric film, which, in turn, results in an excessively high power factor of the electrolytic capacitor, high residual currents and an undesirable retro-formation process which causes slow dissolution of the dielectric film. My researches have shown that these troubles are the result of an improper formation of the oxide-layer on the foil during cleaning and drying.

A method has been heretofore proposed in which the etched foil, after the roughening, is freed from precipitated heavy metals by treatment with nitric acid and after rinsing in cold water, dipped into hot or boiling distilled water, but this far it has not been possible to obtain optimal results with consistency with this treatment.

I have found that a suitable boehmite layer can be formed consistently on the etched foil by treating the foil after etching in hot distilled water in at least two steps, whereby in at least one step the water has a higher temperature than in a preceding step.

In the first bath the etched foil is submitted to a preliminary washing with distilled water at a temperature below 75° C. During the preliminary washing, the chloride content of the etched surface is decreased. Thereafter the etched foil is treated at atmospheric pressure with distilled water, treated in a manner to be described, at a temperature of over 75° C., to form a boehmite layer on the etched aluminum surface. By a treatment with distilled water at a temperature above 75° C. immediately after etching, an excessive quantity of chloride ions would be entrapped by the formation of the boehmite layer, and this is highly undesirable.

I have found that the distilled water used for producing the boehmite layer should have a pH below 7, preferably between 6 and 5, in order to obtain a suitable boehmite layer on an aluminum foil ultimately used in an electrolytic capacitor. It is therefore necessary to adjust accurately the pH-value of the distilled water in which the boehmite layer is to be formed, for example by adding chloride free acid buffers such as acetic acid together with sodium acetate. If this is not done, the pH-value rises easily to a value of 7 to 9 because of the hydrolysis of $Al(OH)_3$.

I have also found that during the subsequent formation of the dielectric film on the electrode by an electrolytic process (e. g. anodic oxidation) the boehmite layer is partially reabsorbed, so that special attention has to be given to the formation of the boehmite layer. If the boehmite layer has been formed in distilled water of a pH of 7.5 or higher, the residual currents of the capacitor are 15 to 30% higher than when the boehmite layer has been formed in water of a pH between 5 and 6.

The thickness of the boehmite layer is an important factor in the treatment of aluminum foil to be used in capacitors. A thickness of between 0.02 and 0.1 micron is suitable, which thickness is built up for example by treating the aluminum foil in the distilled water at 85° C. for a period of time ranging from 30 seconds to 5 minutes. The precise duration of the treatment depends on the desired thickness, the purity of the metal and the roughness of the foil. At a higher temperature of the distilled water, the boehmite layer forms more quickly and the duration of the treatment to obtain a layer of given thickness is shorter.

It is also important that the dehydration of the boehmite layer be controlled. After formation of the same in hot distilled water the etched foil must be dried. I have found that drying either too quickly or too slowly produces unfavorable results. According to my invention the drying should begin at first slowly, for example at 80 to 120° C., and should afterwards be intensified so that a hydrated layer with a water-content of at most 20% is obtained, which layer results in a very low power factor in the capacitor. The highest drying temperature should not exceed 250° C.; otherwise fissures may form in the boehmite layer due to the rate of vaporization of the water, which fissures result in a reduction in the corrosion-preventing property of the etched surface of the foil.

Commercially available boehmite ordinarily has a water content of 15%. During drying the water content may be reduced to 8% without impairing the boehmite structure or its protecting qualities.

Other proposals for providing an etched aluminum foil with a corrosion resisting layer by electrolytic oxidation, for example by treatment with direct current in a solution of oxalic or boric acid, are comparatively expensive and time consuming. The process of the present invention, in comparison, is simple and inexpensive, providing the entire surface of the foil with an effective protection against corrosion which enables it to be stored for years before the formation of the dielectric film thereon. Furthermore, the formation of the boehmite layer allows a considerable saving in the consumption of electric power necessary to form the dielectric film by electrolytic process, which saving may amount to from 20% to 60% in comparison with an etched foil which has only been washed in cold water.

What I claim is:

1. A method of producing a boehmite layer on an etched surface of an aluminum foil intended for use in electrolytic capacitors, said boehmite layer serving to protect the said surface of the foil against corrosion before the formation of a dielectric film on the etched surface, and said boehmite layer also serving to facilitate the formation of the dielectric film by reducing the necessary consumption of electric power in the formation of the dielectric film, said method comprising the steps of washing the foil after etching in at least one bath of distilled water at a temperature below 75° C., subjecting the foil in at least one further bath to the action of distilled water, the pH value of which has been adjusted to a value below 7 and maintained at a value below 7 throughout the treatment, at a temperature within the range of from 75° C. to the boiling point at atmospheric pressure and for a time sufficient to obtain a boehmite layer of a thickness of .02 to .1 micron, and finally drying the boehmite layer at increasing temperature initially not exceeding 120° C. and at no time not exceeding 250° C. until its water content has decreased to 20% or less.

2. A method as set forth in claim 1 in which the foil is subjected to the action of distilled water adjusted to and maintained at a pH value between 6 and 5 for producing the boehmite layer.

References Cited in the file of this patent

UNITED STATES PATENTS

| | | |
|---|---|---|
| 1,451,755 | Backer | Apr. 17, 1923 |
| 2,091,419 | Schroeder | Aug. 31, 1937 |
| 2,477,841 | Ward | Aug. 2, 1949 |
| 2,671,995 | Egan | Mar. 16, 1954 |

FOREIGN PATENTS

| | | |
|---|---|---|
| 471,176 | Great Britain | Aug. 30, 1937 |

OTHER REFERENCES

Goldowski: Abstract of application Serial No. 619,264, filed September 28, 1945; pub. April 29, 1952.

Metal Finishing, October 1954, pages 68 and 69.